US010991297B2

(12) United States Patent
Lee et al.

(10) Patent No.: US 10,991,297 B2
(45) Date of Patent: Apr. 27, 2021

(54) POWER SUPPLY DEVICE THAT OUTPUTS A SIGNAL CORRESPONDING TO WHETHER AC POWER IS INPUT, DISPLAY DEVICE HAVING SAME, AND POWER SUPPLY METHOD

(71) Applicant: SAMSUNG ELECTRONICS CO., LTD., Suwon-si (KR)

(72) Inventors: Yong-joo Lee, Suwon-si (KR);
Sung-yong Joo, Hwaseong-si (KR);
Jeong-il Kang, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/491,722

(22) PCT Filed: Mar. 6, 2018

(86) PCT No.: PCT/KR2018/002648
§ 371 (c)(1),
(2) Date: Sep. 6, 2019

(87) PCT Pub. No.: WO2018/169241
PCT Pub. Date: Sep. 20, 2018

(65) Prior Publication Data
US 2020/0074920 A1    Mar. 5, 2020

(30) Foreign Application Priority Data
Mar. 13, 2017 (KR) .................. 10-2017-0031089

(51) Int. Cl.
G09G 3/20        (2006.01)
G09G 3/3208    (2016.01)
(Continued)

(52) U.S. Cl.
CPC ......... *G09G 3/3208* (2013.01); *G09G 3/3696* (2013.01); *H02M 1/32* (2013.01);
(Continued)

(58) Field of Classification Search
None
See application file for complete search history.

(56) References Cited

U.S. PATENT DOCUMENTS 5,687,139 A    11/1997  Budney
6,198,403 B1    3/2001  Dorrough et al.
(Continued)

FOREIGN PATENT DOCUMENTS

JP    05211729 A * 8/1993
JP    2995962 B2 * 12/1999
(Continued)

OTHER PUBLICATIONS

International Search Report for PCT/KR2018/002648 dated Jun. 18, 2018 with English Translation, 4 pages.
(Continued)

*Primary Examiner* — Kirk W Hermann
(74) *Attorney, Agent, or Firm* — Nixon & Vanderhye, P.C.

(57) ABSTRACT

Provided is a display device. The display device includes a display to display an image, a processor to control the display to display a predetermined image, a power supplier to generate a direct current (DC) power by receiving an alternating current (AC) power, and supply the generated DC power to each of the display and the processor, and a sensor to output a sensing signal corresponding to whether the AC power is input, and the display stops an image display operation according to the sensing signal.

10 Claims, 11 Drawing Sheets

(51) Int. Cl.
  *G09G 3/36* (2006.01)
  *H02M 1/32* (2007.01)
  *H02M 7/219* (2006.01)
  *H02M 1/00* (2006.01)

(52) U.S. Cl.
  CPC ...... *H02M 7/219* (2013.01); *G09G 2330/028* (2013.01); *H02M 2001/0003* (2013.01)

(56) References Cited

U.S. PATENT DOCUMENTS

| | | | |
|---|---|---|---|
| 7,110,268 B2 | 9/2006 | Yasumura | |
| 7,544,108 B2 | 6/2009 | Rzadki et al. | |
| 7,548,052 B2 | 6/2009 | Tzeng | |
| 7,802,121 B1 | 9/2010 | Zansky et al. | |
| 8,350,678 B1 | 1/2013 | Xiong et al. | |
| 8,441,270 B2 | 5/2013 | Lee et al. | |
| 8,570,181 B2 | 10/2013 | Kinsel et al. | |
| 9,048,749 B2 | 6/2015 | Joo et al. | |
| 9,515,569 B2 | 12/2016 | Garcia-Soto | |
| 9,952,267 B2 | 4/2018 | Lee | |
| 2006/0284864 A1* | 12/2006 | Woo | G09G 3/00 345/211 |
| 2008/0002103 A1* | 1/2008 | Lee | G02F 1/133603 349/68 |
| 2011/0013435 A1* | 1/2011 | Lee | G09G 3/296 363/126 |
| 2011/0052217 A1* | 3/2011 | Mochizuki | G03G 15/2039 399/10 |
| 2012/0086914 A1* | 4/2012 | Furihata | G03B 31/04 353/15 |
| 2012/0272179 A1* | 10/2012 | Stafford | G06F 3/038 715/781 |
| 2013/0063412 A1* | 3/2013 | Ide | G06F 3/14 345/212 |
| 2013/0069557 A1* | 3/2013 | Kozuka | H05B 45/50 315/232 |
| 2013/0169990 A1* | 7/2013 | Yoshioka | G03G 15/80 358/1.14 |
| 2014/0368742 A1 | 12/2014 | Joo et al. | |
| 2015/0012151 A1* | 1/2015 | Park | G06F 1/26 700/298 |

FOREIGN PATENT DOCUMENTS

| | | |
|---|---|---|
| JP | 2009-159655 | 7/2009 |
| JP | 2010-115029 | 5/2010 |
| JP | 2011-160629 | 8/2011 |
| KR | 10-2006-0047987 | 5/2006 |
| KR | 10-2008-0001050 | 1/2008 |
| KR | 10-2008-0038506 | 5/2008 |
| KR | 10-2011-0006792 | 1/2011 |
| KR | 10-2011-0048309 | 5/2011 |
| KR | 10-2011-0068005 | 6/2011 |
| KR | 10-2014-0144886 | 12/2014 |
| KR | 10-1472001 | 12/2014 |
| KR | 10-2016-0087110 | 7/2016 |

OTHER PUBLICATIONS

Written Opinion of the ISA for PCT/KR2018/002648 dated Jun. 18, 2018 with English Translation, 13 pages.

Office Action dated Feb. 24, 2021 in counterpart Korean Patent Application No. 10-2017-0031089 and English-language translation.

\* cited by examiner

POWER SUPPLY DEVICE THAT OUTPUTS A SIGNAL CORRESPONDING TO WHETHER AC POWER IS INPUT, DISPLAY DEVICE HAVING SAME, AND POWER SUPPLY METHOD

This application is the U.S. national phase of International Application No. PCT/KR2018/002648 filed Mar. 6, 2018 which designated the U.S. and claims priority to KR Patent Application No. 10-2017-0031089 filed Mar. 13, 2017, the entire contents of each of which are hereby incorporated by reference.

TECHNICAL FIELD

The disclosure relates to a power supply device, a display device having the same, and a power supply method. More particularly, the disclosure relates to a power supply device capable of reducing a capacity of a capacitor in a power supply device by stopping a backlight driving operation during an instantaneous power failure, a display device having the same, and a power supply method.

BACKGROUND ART

A display device is a device in which a digital or analog image signal received from the outside or various image signals and the like stored in an internal storage medium as a compressed file in various formats are processed and displayed.

The display device is provided with a capacitor so that re-setting is not performed, that is, for maintaining hold-up, even when there is no input of an alternating current (AC) power for a predetermined cycle of time. The capacity of the capacitor for maintaining the hold-up is determined by ripple current and hold-up time. A capacitor having a relatively large capacity is required for the display device.

In order to satisfy the large capacity, a related-art display device frequently uses an electrolyte capacitor. However, the electrolytic capacitor has a problem in that fire may be caused to the display device due to environmental causes caused by inter-pole insulation breakdown, defects due to a foreign matter or the like, and over-voltage, and fire to the electrolyte capacitor can cause even fire to the display device.

SUMMARY

Accordingly, the objective of the disclosure is to provide a power supply device capable of reducing the capacity of a capacitor in a power supply device by stopping a backlight driving operation at instantaneous power failure, a display device having the same and a power supply method.

According to an aspect of an exemplary embodiment, there is provided a display device including a display configured to display an image, a processor configured to control the display to display a predetermined image, a power supplier configured to generate a direct current (DC) power by receiving an alternating current (AC) power, and supply the generated DC power to each of the display and the processor, and a sensor configured to output a sensing signal corresponding to whether the AC power is input, and the display stops an image display operation according to the sensing signal.

The display may include a light emitting diode (LED) array, and a driver configured to selectively supply a constant current to the LED array according to the AC sensing signal.

The processor may receive the sensing signal and selectively stop an image display operation of the display according to the received sensing signal.

The display device may further include a speaker configured to output a sound corresponding to the image, and the speaker may stop a sound output operation according to the sensing signal.

The power supplier may output a plurality of DC voltages in different sizes, maintain output of one DC voltage among the plurality of DC voltages, and stop output of another DC voltage according to the sensing signal.

The power supplier may include a first rectifier configured to rectify the AC power to DC power, a capacitor configured to smooth the rectified DC power, a transformer configured to convert the smoothed DC power and output the converted DC power to a plurality of driving powers, a switching unit configured to selectively supply the smoothed DC power to the transformer, a second rectifier configured to rectify a first output voltage that is output from the transformer and output the rectified voltage to a first driving power, a third rectifier configured to rectify a second output voltage that is output from the transformer and output the rectified voltage to a second driving power, and a power controller configured to control the switching unit on the basis of a size of the second driving voltage.

The capacitor may be a film capacitor.

The capacitor may have a capacity of enabling the display device except the display to hold up for 15 ms to 20 ms.

The sensor may include a photo coupler in which a light emitting portion is connected to the capacitor in parallel.

The sensor may include a sensing circuit configured to sense whether AC power is input, on the basis of at least one driving voltage among the plurality of driving powers.

The power supplier may further include a power factor correction (PFC) unit configured to match voltage and current of the rectified AC power to a same phase, and the capacitor may smooth an output voltage of the PFC unit.

The first driving power may be supplied to the display, and the second driving power may be supplied to the processor.

The sensor may include a photo coupler in which a light emitting portion is connected to the AC power in parallel.

According to an embodiment, a power supply device includes an inputter configured to receive an AC power, a converter configured to receive the AC power and output a plurality of DC voltages, and a sensor configured to output a sensing signal corresponding to whether the AC power is input, and the converter may maintain output of one DC voltage among a plurality of DC voltages and stop output of another DC voltage according to the sensing signal.

The converter may include a film capacitor to smooth the rectified AC power.

The sensor may include a photo coupler in which a light emitting portion is connected to the AC power in parallel.

According to an embodiment, an image display method of a display device includes generating an image, displaying the generated image, sensing whether AC power is input, based on input of the AC power not being sensed according to the sensing result, controlling the display device to stop the display operation, while maintaining the generation operation continuously.

Based on the input of the AC power not being sensed according to the sensing result, the stopping the output operation of a sound corresponding to the image may be further included.

The displaying may display an image using a backlight and an LCD element, and the controlling may control the display device so that the display operation is stopped by not supplying a driving power to the backlight.

As described above, the disclosure may reduce the capacity of a capacitor in a power supply device by stopping a backlight driving operation during an instantaneous power failure.

DETAILED DESCRIPTION OF EXAMPLE EMBODIMENTS

Hereinbelow, the disclosure will be described in greater detail with reference to the drawings.

Figure 1:
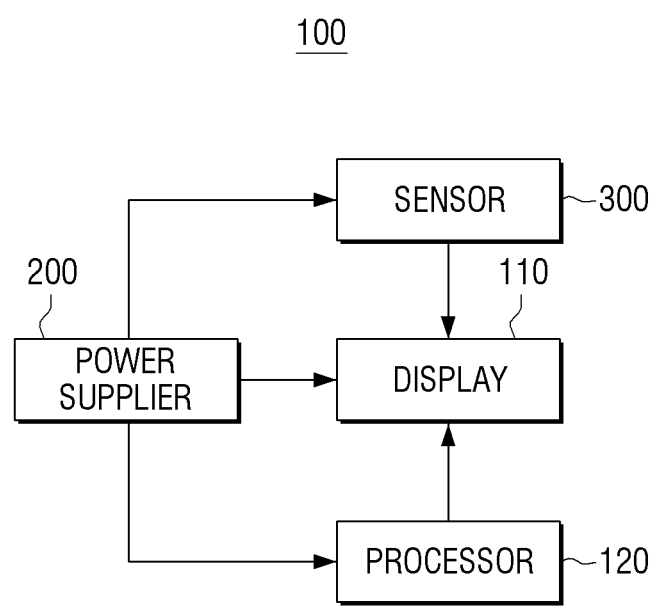
FIG. 1 is a block diagram illustrating a brief configuration of a display device according to an embodiment.

FIG. 1 is a block diagram illustrating a brief configuration of a display device according to an embodiment.

Referring to FIG. 1, a display device 100 according to an embodiment may include a display 110, a processor 120, a power supplier 200, and a sensor 300.

The display 110 displays an image. The display 110 may be implemented as various types of displays such as a liquid crystal display (LCD), organic light emitting diodes (OLED) display, plasma display panel (PDP), or the like. In the display 110, a backlight unit, a driving circuit which may be implemented as a format such as an a-si TFT, low temperature poly silicon (LTPS) TFT, organic TFT (OTFT), or the like, may be included as well. In the meantime, the display 110 may be combined with a touch sensor and implemented as a touch screen.

The display 110 may be a liquid crystal display (LCD) panel which displays a grayscale by transmitting the light emitted from a backlight through the LCD or adjusting the transmittance, or organic light emitting diodes (OLED) which directly emits light corresponding to an image.

If the display 110 is composed of an LCD panel that displays the grayscale by transmitting the light emitted from the backlight through the LCD or adjusting the transmittance, the display 110 may receive power required for the backlight through the power supplier 200, and transmit the light emitted from the backlight to a liquid crystal (LC). The display 110 may receive power to be used for the pixel electrode and the common electrode from the power supplier 200 to be described later, and display an image by adjusting each LC according to an image signal received by an image signal generator 170 to display an image.

Here, the backlight is a configuration which emits light to LCD and may be composed of a cold cathode fluorescent lamp (CCFL), a light emitting diode (LED), or the like. Hereinafter, the backlight is illustrated as being composed of a light emitting diode and a light emitting diode driving circuit, but may be implemented in configurations other than the LED at the time of implementation.

When a light-emitting diode which emits light is used, the backlight should be equipped with an LED driver for LED driving. To be specific, the LED driver is a configuration to provide a constant current corresponding to a brightness value to the LED so that the backlight operates with a brightness value corresponding to the dimming information provided by the image signal generator 170. The LED driver may not provide the constant current to the LED according to the dimming signal.

When the display 110 is an OLED panel, the display 110 may display an image corresponding to an image signal provided from the image signal generator 170 and a driving power supplied from the power supplier 200. For this purpose, the display 110 may include a plurality of pixels including an organic electric field light emitting diode. Here, the organic electric field light emitting diode refers to a "self-emitting organic material" that emits light by using an electroluminescent phenomenon that emits light when a current flows through a fluorescent organic compound.

In the display 110, an image display operation is temporarily stopped according to whether the AC power is input. Specifically, when a backlight is included, in the display 110, operation of the backlight may be temporarily stopped in response to the sensing signal of the sensor 300 described below. In the meantime, if the display 110 is an OLED panel, the power provided to the organic electric field light emitting diode may be stopped and the image display operation may be temporarily stopped. Accordingly, the display device 100 may reduce power consumption at a time when the AC power is not input.

The processor 120 controls the overall operation of the display device 100. To be specific, the processor 120 may control the display 110 to display an image. In addition, the processor 120 may control the display 110 to stop displaying an image according to a sensing state of AC power of the sensor 300, which will be described later. In addition, the processor 120 may also stop the sound output operation, thereby reducing the power consumption at the time when the AC power is not input.

It has been described only an embodiment of temporarily stopping the output of an image or a sound of a display device, but the disclosure may be applied to another configuration than the aforementioned configurations. For example, when the display device provides power to another electronic device using a port such as a universal serial bus (USB), the USB charging function may be temporarily stopped according to the sensing state of the AC power supply.

It has been described that the processor 120 controls the display 110 in accordance with the sensing of the AC power, but in implementation, the display 110, not the processor 120, may stop an image display operation (specifically, a backlight operation) according to a sensed signal of the sensor 300. In addition, in implementation, the power supplier 200, not the display 110, may stop the image display operation by blocking the driving power provided to the backlight. These examples will be described below with reference to FIGS. 4 to 8.

The power supplier 200 supplies power to each configuration in the display device 100. Specifically, the power supplier 200 may generate driving power required for driving the display device 100, and supply the generated driving power to each configuration. If a plurality of driving voltages having different sizes are required for the display device 100, the power supplier 200 may generate a plurality of driving voltages and supply power to each configuration. The configuration will be described in detail with reference to FIG. 3.

The sensor 300 outputs a sensing signal corresponding to whether the AC power is input. The specific circuit and operation of the sensor 300 will be described later with reference to FIGS. 4 to 8.

Figure 2:
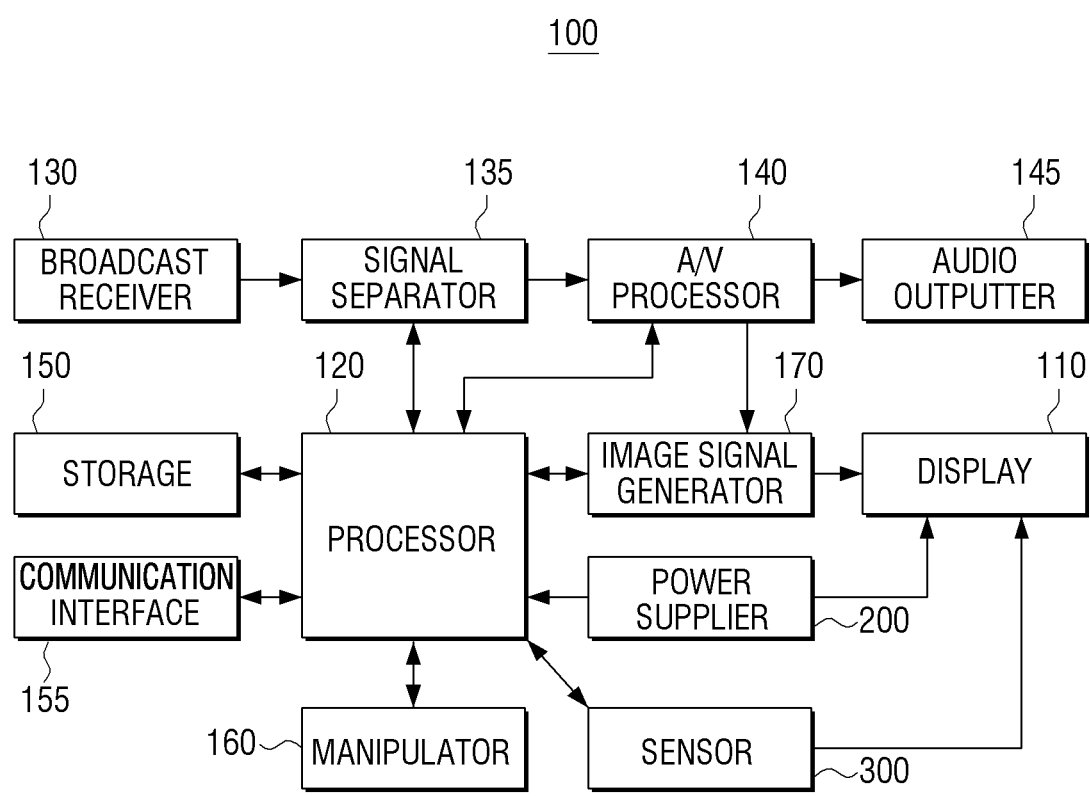
FIG. 2 is a block diagram illustrating a specific configuration of a display device according to an embodiment.

It has been described a simple configuration of the display device 100, but the display device 100 may include a configuration such as FIG. 2. Specific configuration of the display device 100 will be described below with reference to FIG. 2.

FIG. 2 is a block diagram illustrating a specific configuration of a display device according to an embodiment.

Referring to FIG. 2, the display device 100 according to an embodiment may include the display 110, an image signal generator 170, a broadcast receiver 130, a signal separator 135, an A/V processor 140, an audio outputter 145, a storage 150, a communication interface 155, a manipulator 160, the processor 120, and the power supplier 200.

The operation of the display 110 and the power supplier 200 are the same as that of FIG. 1, and will not be further described. In the example, it has been illustrated that the power supplier 200 provides power only to the display 110 and the processor 120, but the power supplier 200 may supply power to all the configurations requiring power in the display device 100.

The broadcast receiver 130 may receive broadcast from a broadcasting station or satellite by wire or wirelessly and demodulate the broadcast.

The signal separator 135 may separate the broadcasting signal received into an image signal, an audio signal, and an additional information signal. The signal separator 135 may transmit the image signal and the audio signal to the A/V processor 140.

The A/V processor 140 may perform signal processing such as video decoding, video scaling, and audio decoding for the image signal and audio signal which are inputted from the broadcast receiver 130 and the storage 150. The A/V processor 140 may transmit the image signal to the image signal generator 170 and transmit an audio signal to the audio outputter 145.

When the received image and audio signal are stored in the storage 150, the A/V processor 140 may output the image and the audio to the storage 150 in a compressed format.

The audio outputter 145 may convert the audio signal received from the A/V processor 140 into sound and output the sound through a speaker (not shown), or output the sound through an external device connected through an external output end (not shown).

The image signal generator 170 may generate a graphic user interface (GUI). The image signal generator 170 may add the generated GUI to the image received from the A/V processor 140. The image signal generator 170 may provide the image signal corresponding to the image to which the GUI is added to the display 110. Accordingly, the display 110 may display various kinds of information provided by the display device 100 and an image transmitted from the image signal generator 170.

The image signal generator 170 may, when it is displayed that the image display operation is temporarily stopped according to temporary cutoff the AC power, display a graphical user interface (GUI) notifying that AC power is unstable and the display on a screen is temporarily stopped.

The image signal generator 170 may extract luminance information corresponding to the image signal and generate a dimming signal corresponding to the extracted luminance information. The image signal generator 170 may provide the generated dimming signal to the display 110. This dimming signal may be a pulse width modulation (PWM) signal.

In the meantime, the image signal generator 170 may vary a dimming signal according to a sensing signal of the sensor 300 and provide the signal to the display 110. For example, when a sensing signal that the AC power is not input is input, the dimming signal not to operate the backlight may be output.

In the embodiment, it has been described that the image signal generator 170 generates a dimming signal and provides the signal to the display 110, but in implementation, the display 110 which receives that image signal may generate and use the dimming signal by itself. In the above embodiment, it has been described that the dimming signal for backlight control is provided to the display 110 only, but the dimming signal may be provided to the power supplier 200. That is, tuning on and off of the backlight may be performed according to the sensing signal of the sensor 300.

The storage 150 may store image contents. To be specific, the storage 150 may receive, from the A/V processor 140, image contents in which image and audio are compressed and store the same, and output the image contents to the A/V processor 140 according to the control of the processor 120. The storage 150 may be implemented as a hard disk, a non-volatile memory, volatile memory, or the like.

The manipulator 160 may be implemented as a touch screen, a touch pad, a key button, a key pad, or the like, and provides a user manipulation of the display device 100. In the embodiment, it has been described that a control command is input through the manipulator 160 included in the display device 100, but the manipulator 160 may receive a user manipulation from an external control device (for example, a remote controller).

The communication interface 155 is a configuration to perform communication with various types of external devices according to various types of communication methods. The communication interface 155 may include a Wi-Fi chip and a Bluetooth chip. The processor 120 may communicate with various types of external devices using the communication interface 155. To be specific, the communication interface 155 may receive a control command from a control terminal device (for example, a remote controller) capable of controlling the display device 100.

In the meantime, though not illustrated in FIG. 2, according to an embodiment, the communication interface 155 may further include a USB port to which a USB connector may be connected, various external input ports for connecting to various external terminals, such as a headset, mouse, LAN, a digital multimedia broadcasting (DMB) chip for receiving and processing the DMB signal, or the like.

The processor 120 controls overall operations of the display device 100. To be specific, the processor 120 may control the image signal generator 170 and the display 110 so as to display an image according to a control command which is inputted through the manipulator 160.

The image signal generator 170 provides an image signal to the display 110. To be specific, in response to the image data, the image signal generator 170 may supply image data and/or various image signals to display image data to the display 110.

The processor 120 may include random-access memory (RAM), read-only memory (ROM), central processing unit (CPU), graphic processing unit (GPU), and a bus. The RAM, ROM, CPU, GPU, or the like may be inter-connected through the bus.

The CPU performs booting using operating system (O/S) stored in the storage 150, by accessing the storage 150. The CPU may perform various operations using various programs, contents, data, or the like, stored in the storage 150.

The ROM stores a command set for booting the system and the like. When the turn-on command is input to supply power, the main CPU copies the O/S stored in the storage 150 to the RAM according to the command set stored in the ROM, and executes the O/S to boot the system. When the booting is completed, the CPU copies various application programs stored in the storage 150 to the RAM, executes the application program copied to the RAM, and performs various operations.

When booting of the display device 100 is completed, the GPU may generate a screen including various objects such as an icon, an image, a text, or the like. The GPU is a configuration to perform a function in the image signal generator as described above. Therefore, in implementation, the GPU may be configured as a separate configuration such as the image signal generator 170, or configured as a system on chip (SoC) coupled with the CPU in the processor 120.

The processor 120 may determine an operation state of the display device 100. To be specific, when a display operation of the display 110 is necessary, the operation state may be determined to be a normal mode, and when the display operation of the display 110 is not necessary, the mode may be determined as a sleep mode (or the power saving mode, the standby mode). The sleep mode may be not only a state of waiting for a user's manipulation (for example, power on command), but also a state of outputting a voice only without display on a screen, but also an internet of things (IoT) communication state to perform communication with another external device in the vicinity.

The processor 120 may vary the operating state of the display 110 according to a sensing signal of the sensor 300. Specifically, when a sensing signal that the AC power is not input is input, the processor 120 may directly control the display 110 not to display an image, or control the image signal generator 170 to output a dimming signal to prevent the backlight from being operated. Further, when the sensing signal that the AC power is not input is input, the processor 120 may control the audio outputter 145 so that no sound is output if the sensing signal is input.

When the AC power is not input, the processor 120 may maintain an operation without shut-down for a predetermined time (for example, 15 ms or 20 ms or more) using power stored in a capacitor in the power supplier 200.

When the AC power has not been input and then is input again, the processor 120 may control the display 110 to display a message that the screen display is temporarily stopped as input of the AC power is not constant.

The display device 100 according to an embodiment may, if the AC power is not input, temporarily reduce power consumption by causing the display 110 not to display an image, that is, causing the backlight not to operate. Accordingly, the size of the capacitor required for the hold-up (instantaneous power) may be reduced, and an area occupied by the capacitor may be reduced accordingly. The capacitor inside the display device 100 may be used as a film capacitor. Accordingly, the possibility of explosion/ignition/fire/smoke of the display device may be fundamentally prevented.

In describing FIG. 2, it has been described that the above function is applied only to a display device which receives and displays broadcasting, but the power supplier to be described later may be applied to any electronic device including a display.

It has been described that the power supplier 200 is a configuration included in the display device 100, but each function of the power supplier 200 may be implemented by a separate device. Hereinafter, referring to FIG. 3, a separate power supply device performing the same function as the power supplier 200 will be described.

It has been described that the sensor 300 is disposed outside the power supplier 200, but the sensor 300 may be disposed inside the power supplier 200.

It has been described that the processor 120 controls the operation of the display in accordance with the sensing of the AC power, but in implementation, it may be implemented that the display operation of the display is directly stopped (for example, using a sensing signal as a dimming control signal or an output control signal of a driving power supply of the power supplier) according to the sensing signal of the sensor.

Figure 3:
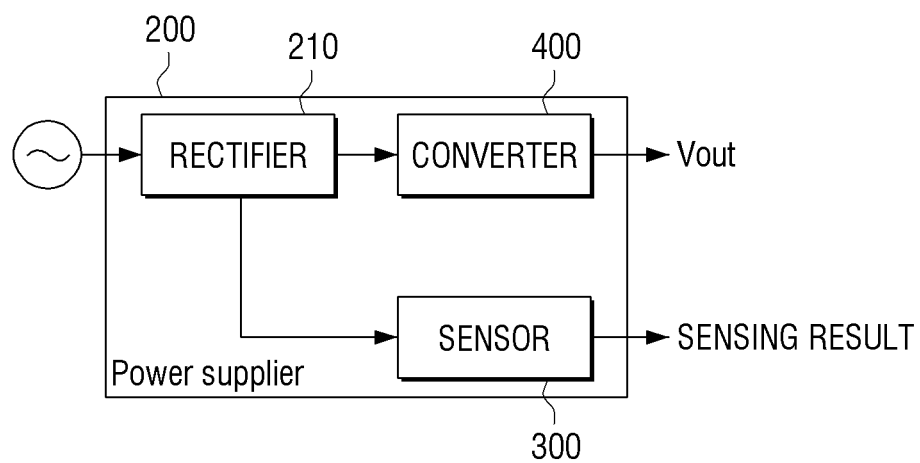
FIG. 3 is a block diagram illustrating a specific configuration of a power supply device according to an embodiment.

FIG. 3 is a block diagram illustrating a specific configuration of a power supply device according to an embodiment.

Referring to FIG. 3, the power supplier 200 may include a rectifier 210, a converter 400, and the sensor 300.

The rectifier 210 rectifies an external AC power to DC power. To be specific, the rectifier 210 may rectify the AC power supplied from the outside using a rectification circuit such as full bridge diode circuit, or the like.

The converter 400 transforms the output voltage of the rectifier 210 to the driving power and outputs the driving power. To be specific, the converter 400 may output a plurality of different direct current (DC) voltage using rectified AC power.

The converter 400 may include a transformer, a switching unit, a power controller, sensing circuits, a second rectifier, and a third rectifier.

The transformer may transform the smoothed DC power and output to a plurality of driving voltages.

The switching unit may provide the smoothed DC power selectively to the primary side winding of the transformer.

The power controller controls a switching operation of the switching unit 421 according to the size of the output voltage sensed by the sensing circuit.

The sensing circuits may provide the size of the driving voltage output from the transformer to the power controller.

The second rectifier may rectify the first output voltage output from the transformer and output the voltage to the first driving power. Here, the first driving power may be power supplied to the backlight of the display.

The third rectifier may rectify the second output voltage output from the transformer and output the voltage as the second driving power. Here, the second driving power may be power provided to the processor.

The sensor 300 outputs a sensing signal corresponding to whether an AC power is input. The sensor 300 may be configured as a photo coupler, a sensing circuit, a transformer, or the like. Not only this circuit configuration, but also any other device which may provide information while maintaining insulation between the primary and secondary sides may be used. The sensing position of the sensor 300 may be various positions such as an input AC power terminal of an AC power, an output end of the hold-up capacitor, a secondary side winding of the transformer, or the like. Various configurations and positions of the sensor 300 will be described below with reference to FIGS. 4 to 8.

The power supplier may further include a hold-up capacitor, and may further include a power factor correction (PFC) unit which should be essentially provided in a device having predetermined or higher level of power consumption.

The hold-up capacitor is a capacitor that charges the power so that the system is not reset for a predetermined time even if the AC power is not temporarily input. The capacitor according to the embodiment may have a capacity such that the display device except the display is not reset for at least 15 ms (when the frequency of the AC power is 60 Hz) or 20 ms (when the frequency of the AC power is 50 Hz). In the disclosure, since the output of the display or the speaker is temporarily stopped at the time when the AC power is not input, the power consumption in the display device is greatly reduced. Therefore, a capacitor capacity which is greater than that of the related-art is not necessary, and it is possible to use a film capacitor which has an excellent performance.

It is possible to replace the electrolyte capacitor with a film capacitor without any of the aforementioned operations, but the film capacity has a volume approximately several ten times larger than that of the electrolyte capacitor, given the same capacity is given. Thus, it is not possible to implement a thin and small display. However, in the embodiment, the capacitor capacity required for the display device has been reduced through the above-mentioned operation, and thus it is possible to use a film capacitor while maintaining a thin and small display.

The PFC unit may correct the power factor by equalizing the voltage and current of the rectified AC power. When the PFC unit is provided to the power supplier 200, the hold-up capacitor may be disposed at an output end of the PFC unit.

As described above, if the AC power is not input, the power supplier 200 according to an embodiment outputs a sensing signal indicating that the AC power is not input, the power consumption at the time when the AC power is not input may be saved using the sensing signal.

In describing FIG. 3, it has been described that the power supplier 200 outputs only a sensing signal corresponding to whether an AC power is input, but in implementation, depending on whether an AC power is input. In the disclosure, some of a plurality of driving powers may output power and the remaining driving power may not output power, according to whether the AC power is input. For example, if it is sensed that the AC power is not input, the second driving power provided to the processor may temporarily stop the output of the first driving power provided to the display, while maintaining the output.

Figure 4:
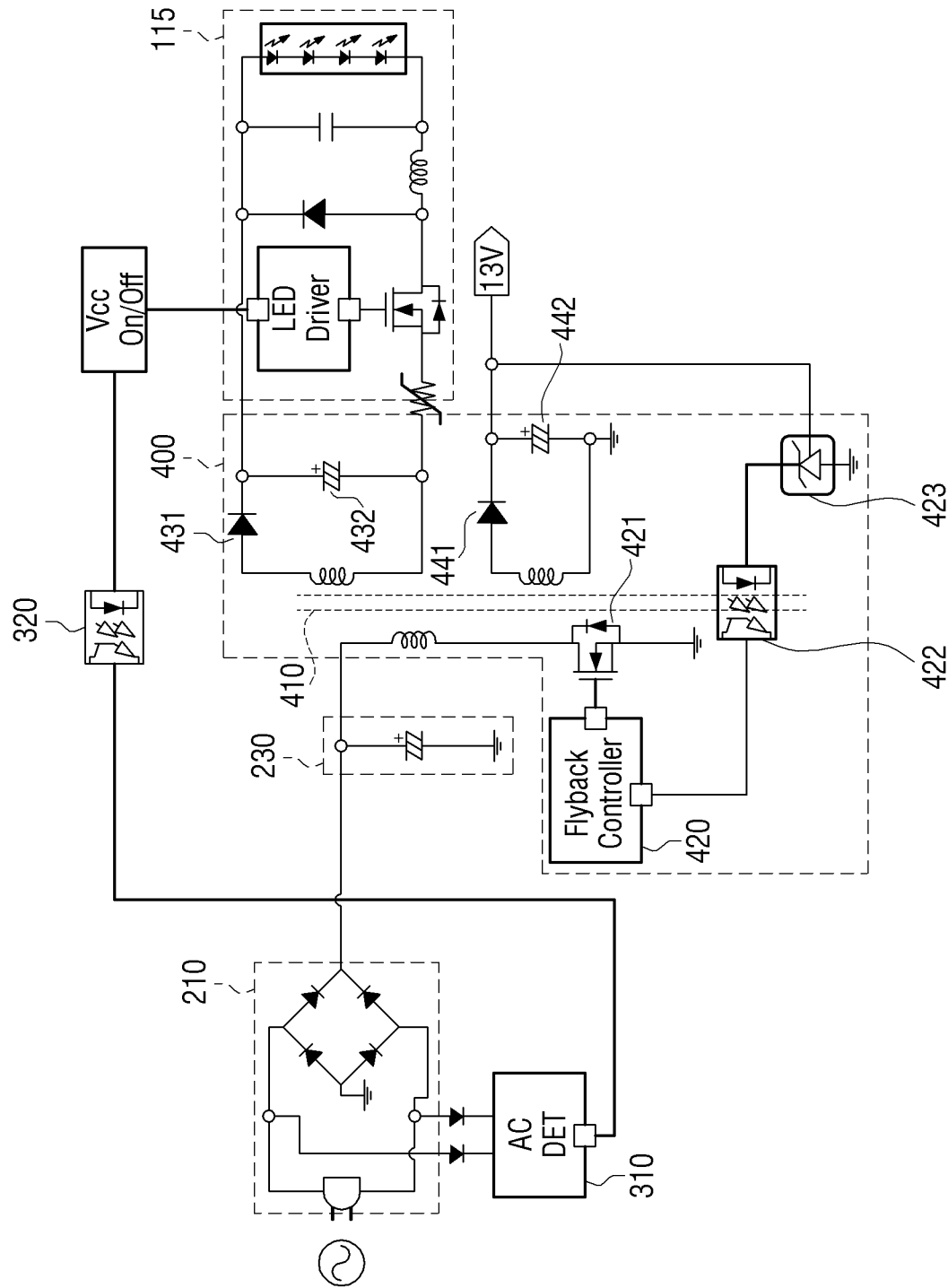
FIG. 4 is a view illustrating a circuit diagram of a power supply device according to a first embodiment.

FIG. 4 is a view illustrating a circuit diagram of a power supply device according to a first embodiment. To be specific, the power supplier according to the first embodiment is an embodiment in which an LED driver directly uses a sensing signal of the sensor in a power supply device applicable to a small-sized display device.

Referring to FIG. 4, the power supplier according to the first embodiment may include the rectifier 210, the hold-up capacitor 230, the converter 400, and the sensor 310.

The rectifier 210 (or first rectifier) rectifies the outside AC power to DC power. To be specific, the rectifier 210 may be implemented as a full bridge wave rectification circuit as illustrated in FIG. 4.

The hold-up capacitor 230 may smooth the rectified AC power.

The transformer 410 may transform the smoothed DC power and output to a plurality of driving voltages.

The switching unit 421 includes one end being connected to the other end of the primary coil of the transformer 410 and the other end being connected to the grounding of the primary end.

The sensing circuit 422, 423 provides the size of the second driving voltage to the power controller 420.

The power controller 420 may control the power-on and power-off state of the switching unit 421 according to the size of the transferred second driving voltage.

The second rectifier 430 may rectify the first output voltage output from the first and secondary coil of the transformer 410 using the diode 431 and the capacitor 432 and output as the first driving power. Here, the first driving power may be power provided to the backlight of the display.

The third rectifier 440 may rectify the second output voltage output from the secondary coil of the transformer 410 using the diode 441 and the capacitor 442 and output as the second driving power. Here, the second driving power may be power provided to the processor.

The sensor 310 may directly output to the display 110 the sensing signal corresponding to whether the AC power is input. Specifically, the sensor 310 may provide the sensing signal to the LED driver of the backlight 115 of the display using the photo coupler 320 in which the light emitting portion is connected to the AC power in parallel.

Accordingly, when the LED driver receives a sensing signal indicating that AC power is input, the LED driver may provide a constant current to the LED array according to the dimming signal provided by the display or video signal generator in a general manner. If a sensing signal that AC power is not being input is input, the LED driver may not provide the constant current to the LED array.

At this time, the processor 120 is provided with the second driving current continuously, and thus, while the display device 100 maintains an operation without being reset, the backlight does not operate and power consumption may be reduced.

Thereafter, when the AC power is input again, the sensor 300 may output the sensing signal to input the AC power, and the LED driver may provide the constant current corresponding to the dimming signal to the LED array again.

In the above description, it has been described that the LED driver directly uses the sensing signal of the sensor 300. However, in the implementation, the processor 120 may receive the sensing signal and the processor 120 may control the LED driver. This will be described below with reference to FIG. 5.

Figure 5:
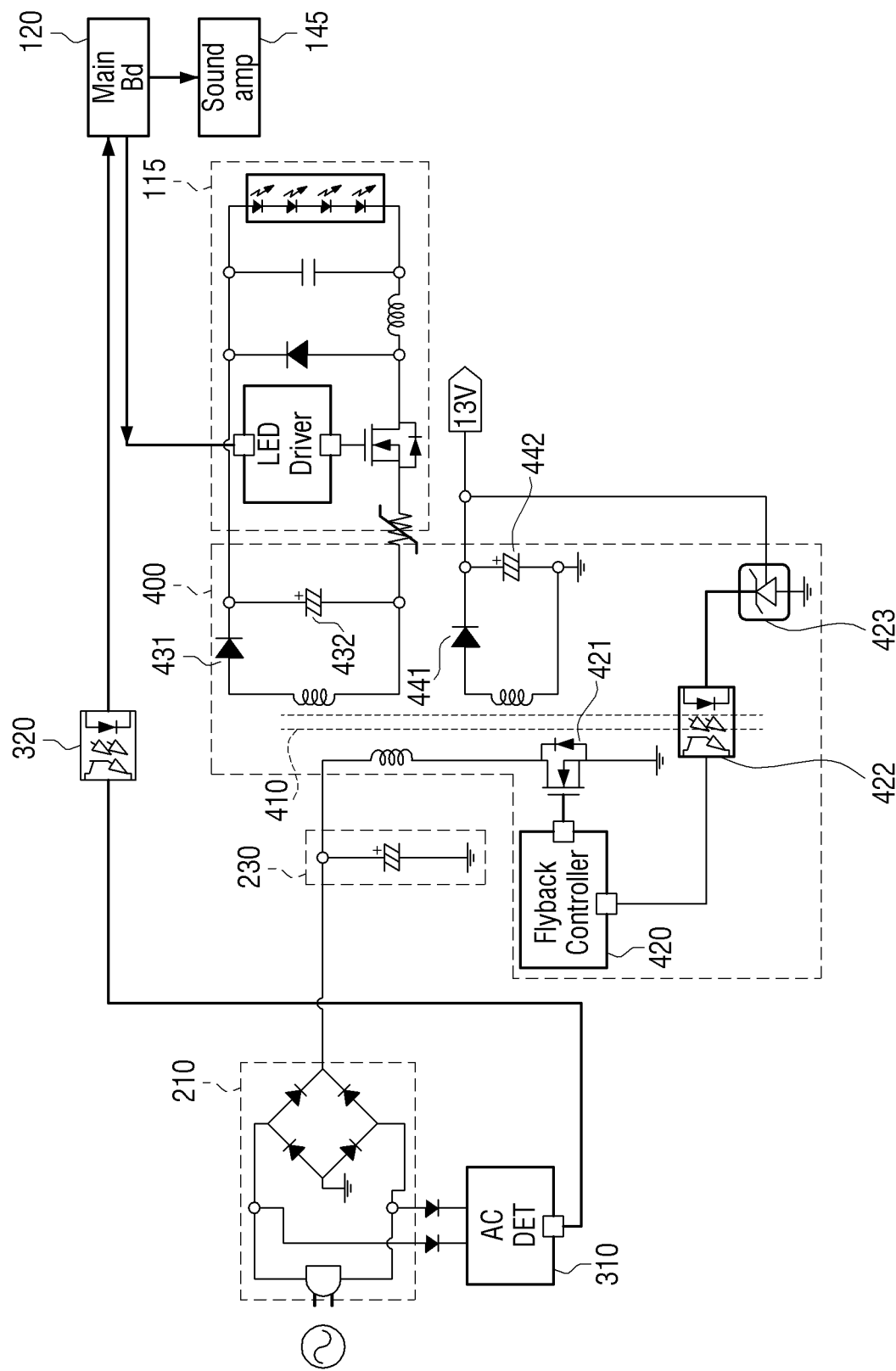
FIG. 5 is a view illustrating a circuit diagram of a power supply device according to a second embodiment.

FIG. 5 is a view illustrating a circuit diagram of a power supply device according to a second embodiment. To be specific, according to the second embodiment, in the power supplier that is applicable to a small-sized display device, the processor controls the LED driver using the sensing signal.

Referring to FIG. 5, a power supplier according to the second embodiment may include the rectifier 210, the hold-up capacitor 230, the converter 400, and the sensor 310.

The configurations of the rectifier 210, the hold-up capacitor 230, and the converter 400 are the same as the embodiment of FIG. 4 and will not be further described.

The sensor 310 outputs, to the processor 120, a sensing signal corresponding to whether the AC power is input. Specifically, the sensor 310 may generate the sensing signal using the photo coupler 320 in which the light emitting portion is connected to the AC power in parallel, and provide the generated sensing signal to the processor 120.

Accordingly, when a normal sensing signal is input, the processor 120 may provide a normal dimming signal to the LED driver so that the image display operation may be performed.

However, if the sensing signal indicating that the AC power is not input is input, the processor 120 may provide a dimming signal causing the LED not to emit light to the LED driver so that the backlight does not operate.

At this time, the processor 120 may stop the sound output operation of the speaker 145 as well.

It has been described that the processor 120 controls the LED driver with the dimming signal, but in implementation, a separate control signal (VCC control signal) other than the dimming signal may be used.

In the meantime, it has been described that the embodiment is applied to only a small-sized display device, but in implementation, the embodiment may be applied to a power supplier of a large-sized display device including the PFC part. This will be described below with reference to FIG. 6.

Specifically, a power supplier according to the third embodiment is an embodiment in which the LED driver directly uses the sensing signal of the sensor in a power supplier applicable to a large-sized display device.

Figure 6:
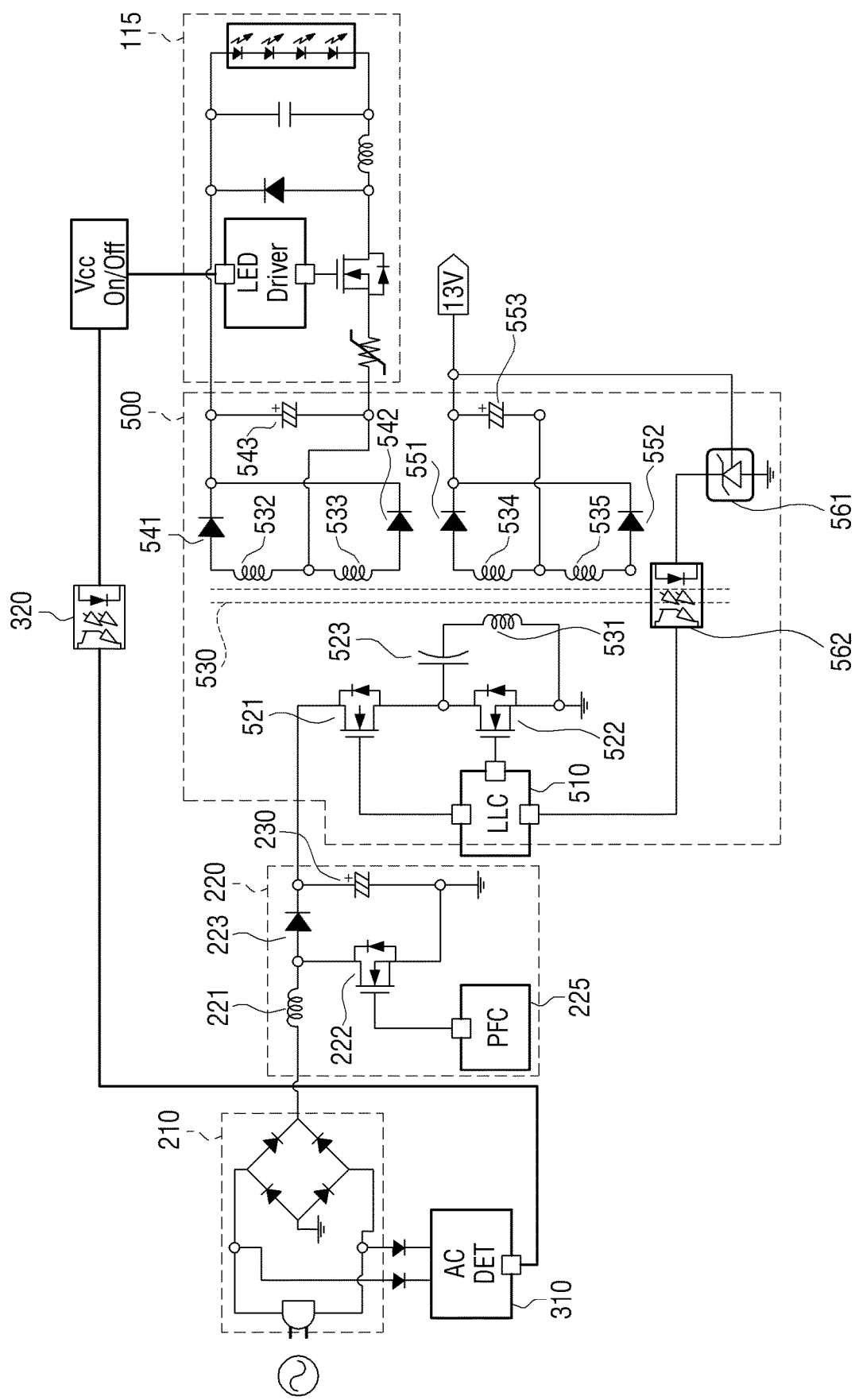
FIG. 6 is a view illustrating a circuit diagram of a power supply device according to a third embodiment.

Referring to FIG. 6, the power supplier according to the third embodiment may include the rectifier 210, the PFC unit 220, the hold-up capacitor 230, a converter 500, and the sensor 310.

The rectifier 210 rectifies the external AC power to the DC power. To be specific, the rectifier 210 may be composed of the full-bridge diode circuit.

The PFC unit 220 matches the voltage and current of the rectified AC power to the same phase. To be specific, the PFC unit 220 may include an inductor 221, a first switch 222, a first diode 223, the hold-up capacitor 230, and a PFC controller 225. In the illustrated example, it has been described that the hold-up capacitor 230 is included in the PFC unit, but in implementation, the hold-up capacitor 230 may be a capacity outside of the PFC unit 220.

The inductor 221 includes one end being connected to the rectifier 210 to receive the rectified DC power, and the other end being connected commonly to the anode of the first diode 223 and one end of the first switch 222.

The first switch 222 includes one end being commonly connected to the other end of the inductor 221 and the anode of the first diode 223, the other end is grounded, and the first switch 222 performs a switching operation according to a driving signal of the PFC controller 225.

The diode 223 includes the anode being commonly connected to the other end of the inductor 221 and the one end of the first switch 222, and the cathode being commonly connected to the one end of the hold-up capacitor 230 and the converter 500.

The hold-up capacitor 230 includes the one end being commonly connected to the cathode of the diode 223 and the converter 500, and the other end being grounded with the other end of the first switch 222.

The PFC controller 225 may control the connection state of the first switch 222 to equalize the voltage and current of the rectified AC power in the rectifier 210 to the same phase.

The PFC controller 225 controls the connection state of the first switch 222 to match the voltage and current of the AC power rectified by the rectifier 210 in the same.

The converter 500 transforms the output voltage of the PFC unit 220 into a driving power and outputs the driving power. The converter 500 may be implemented with an LLC resonant converter and when implemented with the LLC resonant converter, the converter 500 may include an LLC controller 510, a second switch 521, a third switch 522, a second capacitor 523, a transformer 530, a second diode 541, a third diode 542, a third capacitor 543, a fourth diode 551, a fifth diode 552, and a fourth capacitor 553. In the meantime, the circuit configuration of the LLC resonant converter is an example. Therefore, with another circuit configuration performing the same function, the LLC resonant converter circuit may be implemented.

The second switch 521 includes one end being connected to the output end of the PFC unit 220, and the other end being connected to the one end of the third switch 522.

The third switch 522 of which one end is connected to the other end of the second switch 521, and the other end is grounded. As such, the second switch 521 and the third switch 522 are connected in series and perform a switching operation under the control of the LLC controller 510.

The second capacitor 523 of which one end is commonly connected to the other end of the second switch 521 and the one end of the third switch 522, and the other end is connected to the one end of the primary winding 531.

The transformer 530 may have the primary winding 531 and a plurality of secondary windings 532, 533, 534, and 535, and the primary winding and the plurality of secondary windings may have a predetermined turn ratio. Here, one end of the primary winding 531 is connected to the other end of the second capacitor 523, and the other end of the primary winding 531 is grounded.

The one end of the secondary winding 532 is connected to the anode of the second diode 541 and the other end is commonly connected to the one end of another secondary winding 533 and the other end of the third capacitor 543. The one end of the secondary winding 533 is commonly connected to the other end of the another secondary winding 532 and the other end of the third capacitor 543, and the other end is connected to the anode of the third diode 542.

The second diode 541 of which the anode is connected to one end of the secondary winding 532, and the cathode is commonly connected to the cathode of the third diode 533 and the one end of the third capacitor 543.

The third diode 542 of which the anode is connected to the other end of the secondary winding 533 and the cathode is commonly connected to the cathode of the second diode 541 and one end of the third capacitor 543.

The third capacitor 543 of which one end is commonly connected to the cathode of the second diode 541 and the cathode of the third diode 542, and the other end is connected to the center tap of the transformer 530. Accordingly, the center tap side operates with the reference voltage (secondary side ground) of the output voltage, and the voltage of the third capacitor 543 becomes the first driving voltage.

Here, the first driving power is provided to the backlight of the display.

One end of the secondary winding 534 is connected to the anode of the fourth diode 551 and the other end is connected to one end of the other secondary winding 535 and the end of the fourth capacitor 553 by the center tap. One end of the secondary winding 535 is commonly connected to the other end of the other secondary winding 534 and the other end of the fourth capacitor 553, and the other end is connected to the anode of the fifth diode 551.

The fourth diode 551 of which anode is connected to one end of the secondary winding 534, and the cathode is commonly connected to one end of the cathode of the fifth diode 535 and one end of the fourth capacitor 553.

The fifth diode 552 of which the anode is connected to the other end of the secondary winding 535, and the cathode is commonly connected to the cathode of the fourth diode 551 and the one end of the fourth capacitor 553.

One end of the fourth capacitor 553 is commonly connected to the cathode of the fourth diode 551 and the cathode of the fifth diode 552 and the other end is connected to the center tap of the transformer 530. Accordingly, the center tap side operates with the reference voltage (secondary side grounding) of the output voltage, and the voltage of the fourth capacitor 553 becomes the second driving voltage. Here, the second driving power is provided to the processor.

The LLC controller 510 controls operations of the second switch 521 and the third switch 522 to output a predetermined second driving voltage. The operation is a general operation in the LLC resonant converter and an operation of the LLC related thereto will be omitted.

The sensing circuits 561, 562 senses the size of the output load receiving the input of the second driving power. To be specific, the sensing circuits 561, 562 may be composed of the photo coupler 562 and the diode 561.

The diode 561 converts a flowing current according to the size of the output load of the converter 500 and provides to the photo coupler 562.

The photo coupler 562 provides the voltage information corresponding to the size of the provided current to the converter 500.

The sensor 310 directly outputs, to the display 110, a sensing signal corresponding to whether the AC power is input. Specifically, the sensor 310 may provide a sensing signal to the LED driver of the backlight 115 of the display by using the photo coupler 320 in which the light emitting portion is connected to the AC power in parallel. The operation of the sensor 310 is the same as that in the embodiment of FIG. 4, and redundant description is omitted.

As such, the power supplier according to the third embodiment may provide power suitable for a large-scaled display device.

Figure 7:
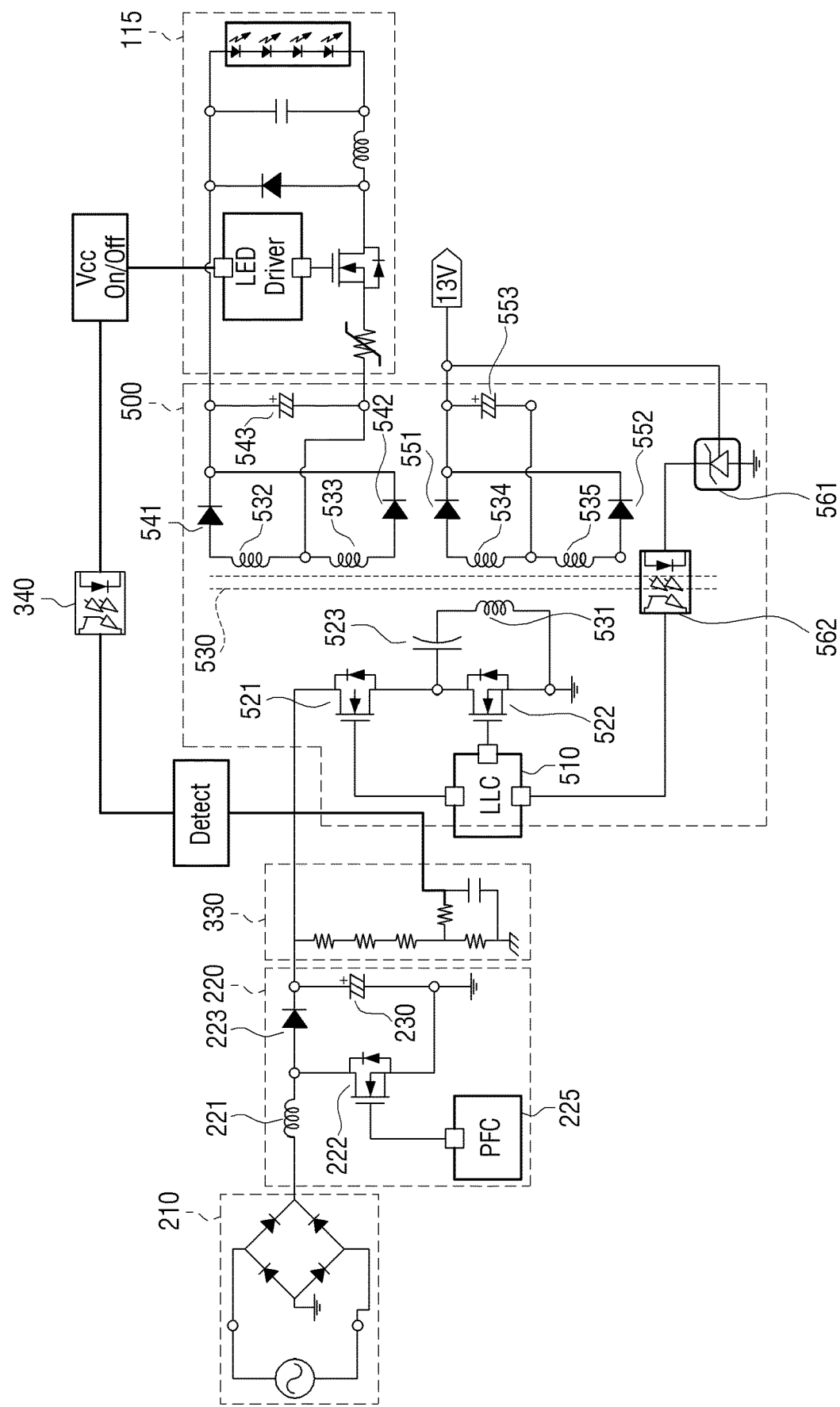
FIG. 7 is a view illustrating a circuit diagram of a power supply device according to a fourth embodiment.

FIG. 7 is a view illustrating a circuit diagram of a power supply device according to a fourth embodiment. Specifically, the power supplier according to the fourth embodiment is an embodiment for checking whether the AC power is input using the voltage of the hold-up capacitor in a power supplier applicable to a large-sized display device.

Referring to FIG. 7, the power supplier according to the fourth embodiment may include the rectifier 210, the PFC unit 220, the hold-up capacitor 230, and the converter 500.

The rectifier 210, the PFC unit 220, the hold-up capacitor 230, and the converter 500 are the same as the third embodiment of FIG. 6, and will not be further described.

The power supplier may further include a sensor. The sensor may output whether the AC power is input, using the voltage value of the hold-up capacitor 230. To be specific, as illustrated in FIG. 7, the sensor may include a voltage divider 330 and a photo coupler 340.

The voltage divider 330 divides the voltage of the hold-up capacitor 230 using a plurality of resistors and capacitors, and provides voltage to the photo coupler 340. Specifically, the voltage divider 330 detects whether the voltage of the hold-up capacitor 230 is equal to or less than a predetermined value.

The photo coupler 340 provides the detection result of the voltage divider 330 to the secondary side of the transformer. Specifically, when the voltage of the hold-up capacitor is less than or equal to a predetermined voltage, the photo coupler 340 may provide the LED driver of the backlight 115 of the display that the AC power is not being input.

Specifically, when the AC power is not input, the voltage of the hold-up capacitor 230 will be gradually dropped and when the voltage of the hold-up capacitor falls below or equal to the predetermined voltage, the sensor may sense that the AC power is not input.

Specifically, a power supplier according to the fifth embodiment is an embodiment in which whether the AC power is input is identified using the second winding of the transformer in the power supplier applicable to a small-sized display device.

Figure 8:
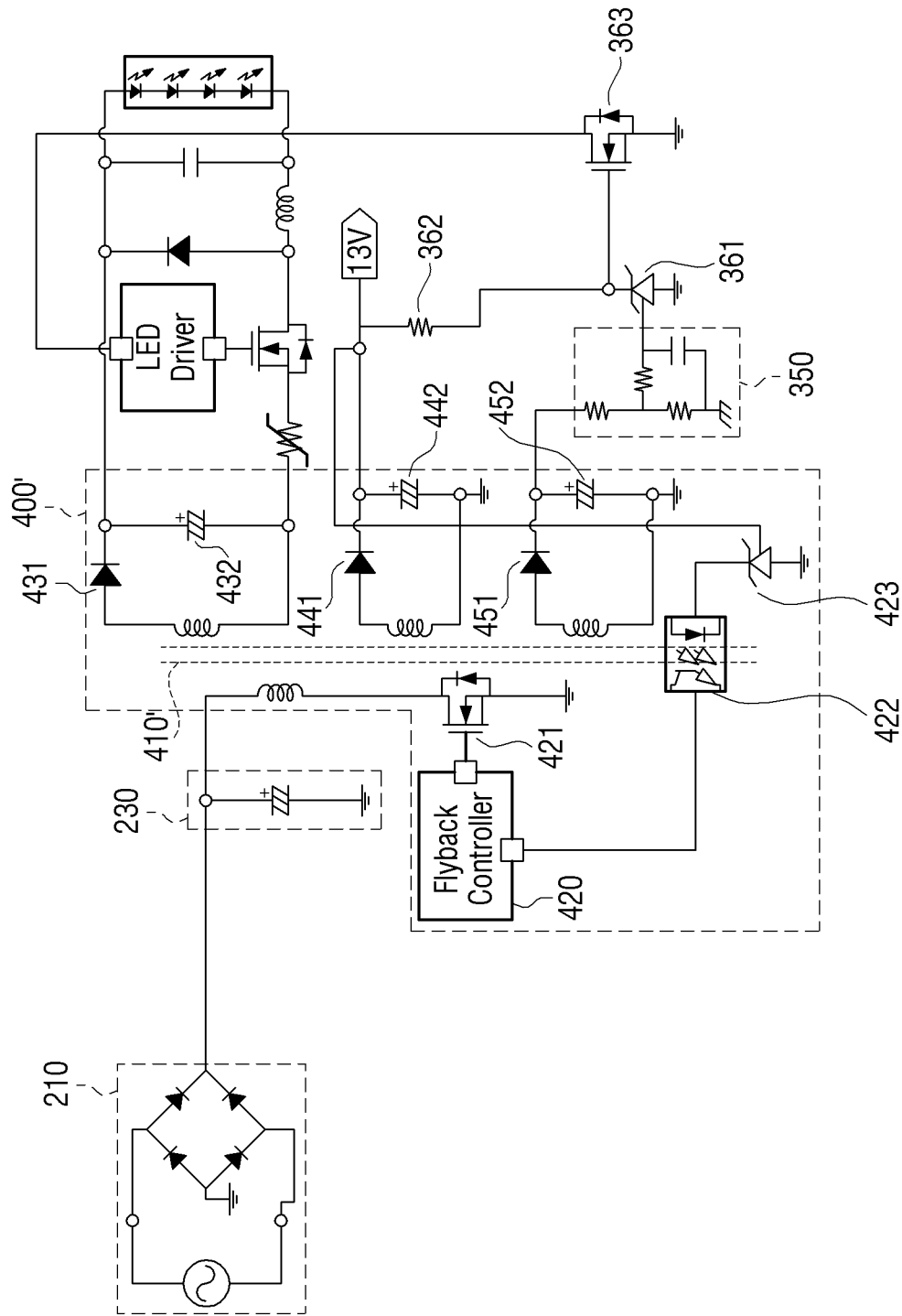
FIG. 8 is a view illustrating a circuit diagram of a power supply device according to a fifth embodiment.

The power supplier may include the rectifier 210, the hold-up capacitor 230, and a converter 400' as illustrated in FIG. 8. The power supplier may further include a sensor.

The rectifier 210 and the hold-up capacitor 230 are the same as the first embodiment of FIG. 4 and will not be described.

The converter 400' is composed of the transformer 410 including three secondary windings, and the primary winding and the plurality of secondary windings may have a predetermined turn ratio. Here, two of the secondary windings are connected to the second rectifier and the third rectifier in the same manner as FIG. 4, and a description thereof will be omitted.

In the meantime, the remaining one secondary winding is used to identify whether the AC power is input.

Specifically, if the AC power is not input, the voltage of the hold-up capacitor 230 gradually decreases, and thus, the voltage induced in the secondary winding is also lowered by a predetermined ratio of the transformer. Accordingly, when the voltage induced in the secondary winding falls below a predetermined voltage, the sensor detects that the AC power is not input.

The sensor outputs whether the AC power is input, using the secondary winding of the transformer. Specifically, as illustrated in FIG. 8, whether the voltage induced in the secondary winding of the transformer is less than or equal to a predetermined voltage is compared using a voltage divider circuit 350, and as a result of the comparison, if the voltage is less than or equal to a predetermined voltage, a switch 363 and a diode 361 may be manipulated to provide a sensing signal to the LED driver.

Figure 9:
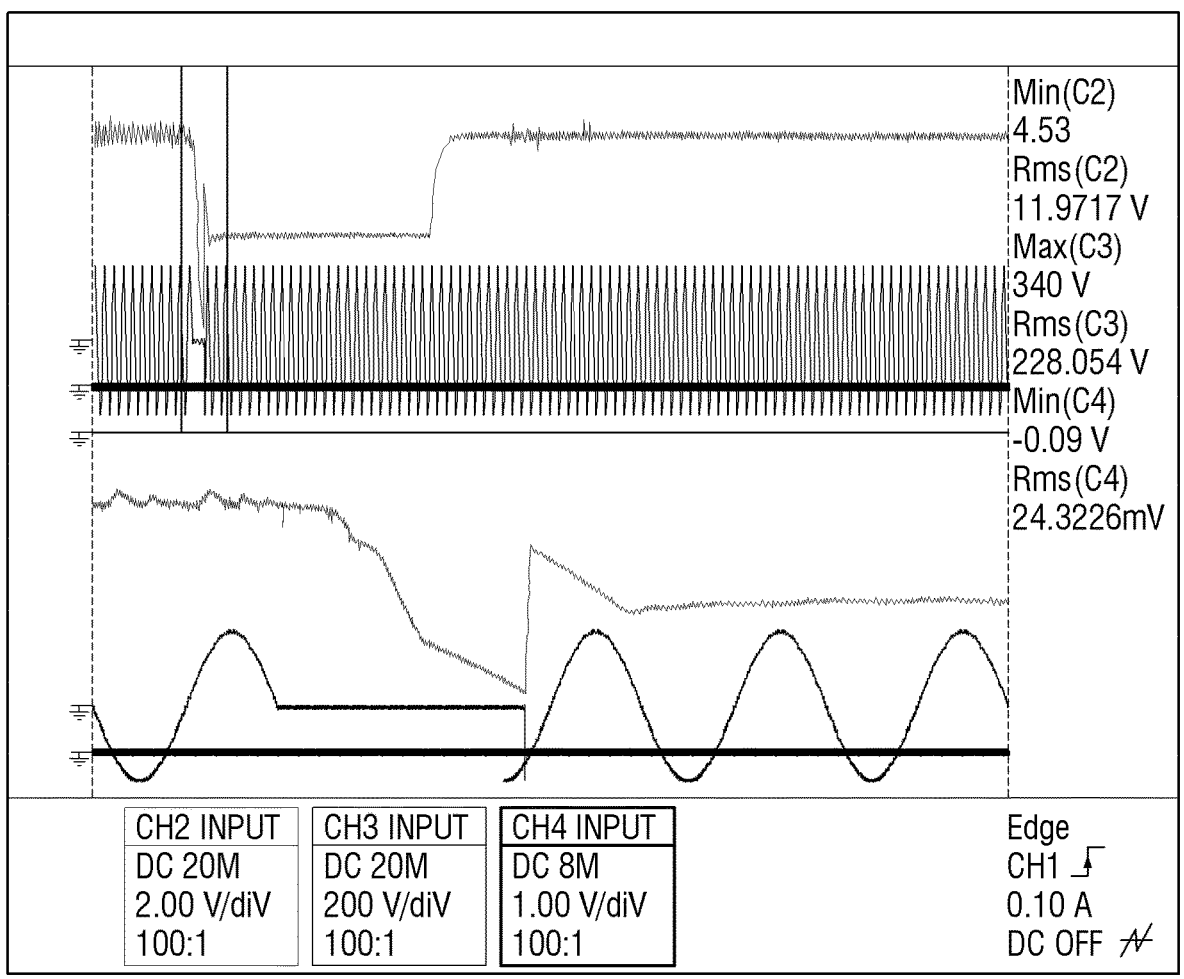
FIG. 9 is an output waveform diagram according to whether the AC sensing circuit operates.
Figure 10:
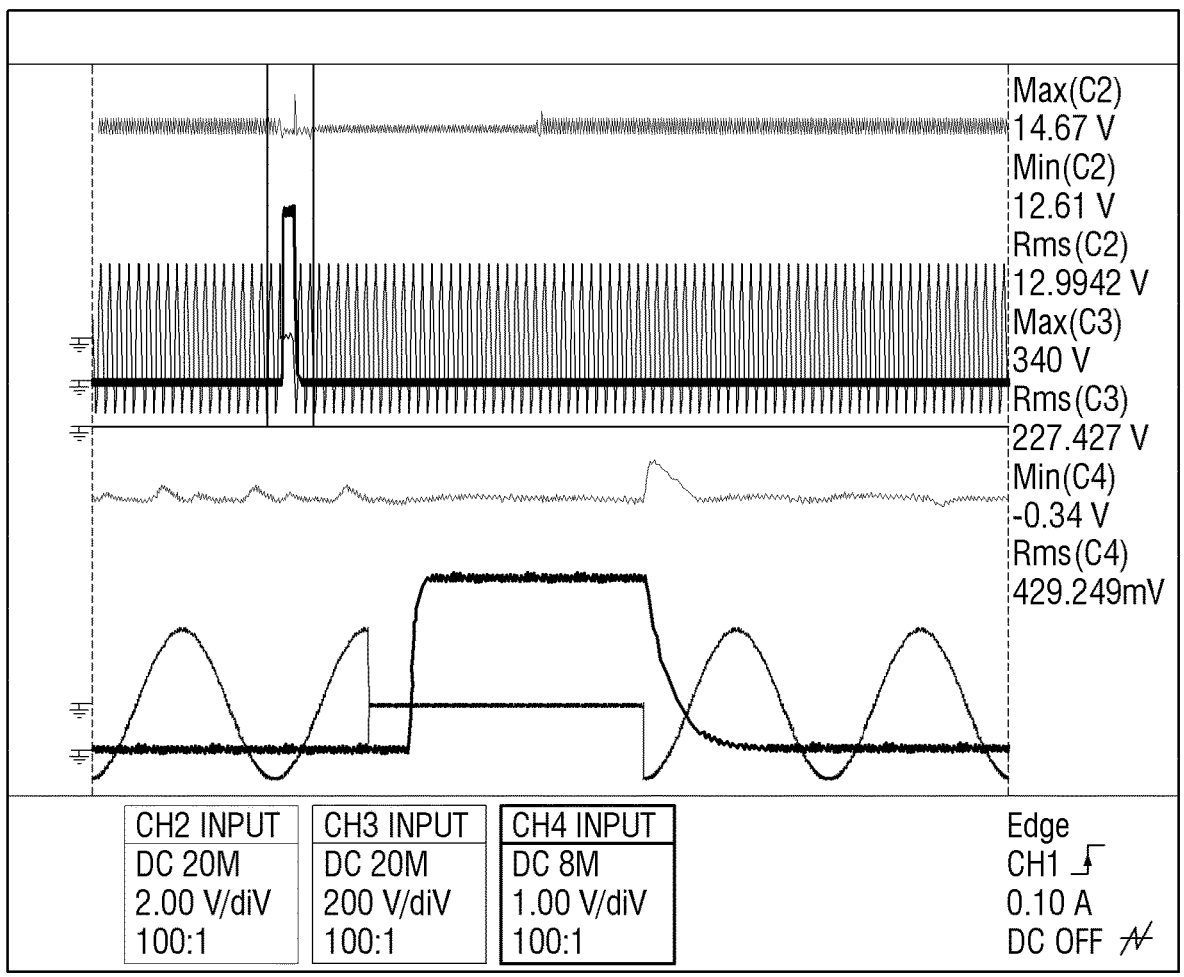
FIG. 10 is an output waveform diagram according to whether the AC sensing circuit operates.

FIGS. 9 and 10 are output waveform diagrams according to whether the AC sensing circuit operates. Specifically, FIG. 9 is an output waveform diagram when the sensing circuit as the embodiment is not provided, and FIG. 10 is an output waveform diagram when the sensing circuit as the embodiment is provided.

Referring to FIG. 9, when the AC power is temporarily stopped in the absence of the sensing circuit, the driving voltage drops below or equal to a predetermined voltage, and it is confirmed that the system rebooting is performed. Referring to FIG. 10, it may be confirmed that even if the AC power is temporarily stopped, the driving voltage is maintained to be constant and the system rebooting is not performed.

Figure 11:
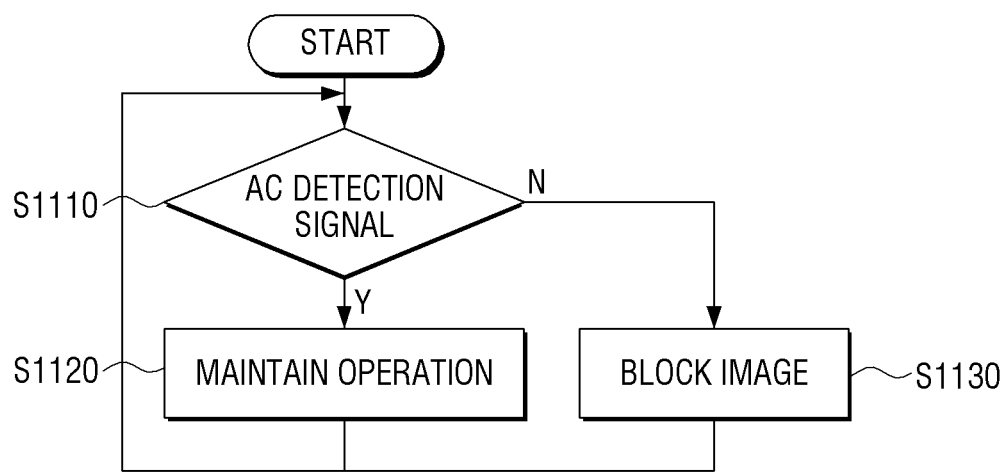
FIG. 11 is a flowchart to describe a power supply method according to an embodiment.

FIG. 11 is a flowchart to describe a power supply method according to an embodiment.

Referring to FIG. 11, when power is input to the display device and the display device operates, an image is generated, and the generated image is displayed on the display.

During the display operation, whether the AC power is input is continuously sensed on a real time basis in step S1110.

If it is identified that the AC power is continued to be input in step S1110-Y, the aforementioned display operation may be continued in step S1120.

On the contrary, if the AC power is identified to be blocked in S1110-N, the operation of displaying the image may be stopped in step S1130, while the operation of generating the image is maintained. Specifically, if the display device is a device for displaying an image with a backlight, supply of the driving power to the backlight may be temporarily stopped to stop displaying the image. At this time, the output of the sound corresponding to the image may be stopped together.

In the meantime, if it is identified that AC power is supplied again, the operation to display an image may resume.

Accordingly, the power supply method according to an embodiment may, when the AC power is not input, reduce power consumption temporarily so that the display 110 does not display an image, that is, a backlight does not operate. Accordingly, the size of a capacitor necessary for hold-up (instantaneous power) may be reduced, and the area occupied by the capacitor may be reduced accordingly, and the capacitor inside the display device 100 may be used as a film capacitor. Accordingly, the possibility of explosion/ignition/fire/smoke of the display device may be fundamentally prevented. The power supply method of FIG. 11 may be implemented on a display device having the configuration of FIG. 1 or 2 or a power supplier having the configuration of FIG. 3, or a display device or a power supplier having another configuration.

The power supply method as described above may be implemented as a program including an algorithm executable by a computer, and the above program may be stored in a non-transitory computer readable medium and provided.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

While the disclosure has been shown and described with reference to various embodiments thereof, it will be understood by one of ordinary skill in the art that various changes in form and details may be made therein without departing from the spirit and scope of the disclosure as defined by the appended claims and their equivalents.

What is claimed is:

1. A display device comprising:
   a display;
   a processor configured to control the display to display an image;
   a power supplier configured to generate a first driving voltage and a second driving voltage by using an alternating current (AC) power inputted to the power supplier, and supply the first driving voltage to the display and the second driving voltage to the processor; and
   a sensor configured to output a sensing signal corresponding to whether the AC power is input,
   wherein the display stops an operation for displaying the image based on the sensing signal, and
   wherein the power supplier comprises:
      a first rectifier configured to rectify the AC power to a direct current (DC) voltage;
      a capacitor configured to smooth the DC voltage;
      a transformer configured to output a plurality of voltages by converting the smoothed DC voltage;
      a switching unit configured to selectively supply the smoothed DC voltage to the transformer;
      a second rectifier configured to output the first driving voltage by rectifying a first voltage among the plurality of voltages;
      a third rectifier configured to output the second driving voltage by rectifying a second voltage among the plurality of voltages; and
      a power controller configured to control the switching unit based on a size of the second driving voltage,
   wherein the sensor comprises a sensing circuit configured to sense whether AC power is input, based on at least one voltage among the plurality of voltages.

2. The display device of claim 1, wherein the display comprises:
   a light emitting diode (LED) array; and
   a driver configured to selectively supply a constant current to the LED array based on the sensing signal.

3. The display device of claim 1, wherein the processor is configured to receive the sensing signal and selectively stop the operation for displaying the image based on the received sensing signal.

4. The display device of claim 1, further comprising:
   a speaker configured to output a sound corresponding to the image,
   wherein the speaker is configured to stop an operation for outputting a sound based on the sensing signal.

5. The display device of claim 1, wherein the power supplier is configured to output the first driving voltage and the second driving voltage with different sizes, and maintain output of the second driving voltage and stop output of the first driving voltage based on the sensing signal.

6. The display device of claim 1, wherein the capacitor is a film capacitor.

7. The display device of claim 1, wherein the capacitor has a capacity of enabling the display device except the display to hold up for 15 ms to 20 ms.

8. The display device of claim 1, wherein the sensor comprises:
   a photo coupler in which a light emitting portion is connected to the capacitor in parallel.

9. The display device of claim 1, wherein the power supplier further comprises:
   a power factor correction (PFC) unit configured to match voltage and current of the rectified AC power to a same phase,
   wherein the capacitor is configured to smooth an output voltage of the PFC unit.

10. The display device of claim 1, wherein the sensor comprises:
    a photo coupler in which a light emitting portion is connected to the AC power in parallel.

* * * * *